US012443127B2

(12) United States Patent
Shimizu et al.

(10) Patent No.: US 12,443,127 B2
(45) Date of Patent: Oct. 14, 2025

(54) IMAGE FORMING APPARATUS HAVING ODOR SENSOR FOR DETECTING ODOR DIFFUSING FROM ODOR GENERATOR ON TONER CONTAINER

(71) Applicant: KYOCERA Document Solutions Inc., Osaka (JP)

(72) Inventors: Tamotsu Shimizu, Osaka (JP); Yoshihiro Yamagishi, Osaka (JP); Kazuki Nakai, Osaka (JP); Shiori Kihara, Osaka (JP); Shinya Sakaoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/910,584

(22) Filed: Oct. 9, 2024

(65) Prior Publication Data

US 2025/0123578 A1 Apr. 17, 2025

(30) Foreign Application Priority Data

Oct. 17, 2023 (JP) ................................ 2023-178682

(51) Int. Cl.
*G03G 15/08* (2006.01)

(52) U.S. Cl.
CPC ..... *G03G 15/0863* (2013.01); *G03G 15/0872* (2013.01); *G03G 2215/0665* (2013.01); *G03G 2215/0695* (2013.01)

(58) Field of Classification Search
CPC .......... G03G 15/0863; G03G 15/0872; G03G 15/0867; G03G 15/087; G03G 2215/066;
(Continued)

(56) References Cited

U.S. PATENT DOCUMENTS

2006/0265742 A1* 11/2006 Rommelmann ... G03G 15/0863 726/16
2007/0183794 A1 8/2007 Okada ............................ 399/12
(Continued)

FOREIGN PATENT DOCUMENTS

JP 2005224504 A * 8/2005
JP 2007-212698 A 8/2007
(Continued)

*Primary Examiner* — Robert B Beatty
(74) *Attorney, Agent, or Firm* — Stein IP, LLC

(57) ABSTRACT

An image forming apparatus includes an image forming portion, a toner storage container, an odor generator, an odor sensor, and a control portion. The image forming portion includes an image carrying member and a development device that develops an electrostatic latent image formed on the image carrying member into a toner image. The toner storage container is rotatable, stores toner for forming the toner image, and is removably mountable in the image forming apparatus. The odor generator is provided at a position where it is rotatable together with the toner storage container, and carries an odor substance. The odor sensor senses the odor substance diffusing from the odor generator. The control portion rotates the toner storage container after its mounting in the image forming apparatus before toner supplying operation, and senses the odor substance at a sensing position where the odor generator is closest to the odor sensor.

8 Claims, 14 Drawing Sheets

(58) Field of Classification Search
CPC ... G03G 2215/0663; G03G 2215/0665; G03G 2215/0695; B41J 2/17543
USPC .......................................... 399/12, 27, 262
See application file for complete search history.

(56) References Cited

U.S. PATENT DOCUMENTS

| | | | | |
|---|---|---|---|---|
| 2009/0041481 | A1 * | 2/2009 | Iida | G03G 15/5079 399/12 |
| 2015/0277372 | A1 * | 10/2015 | Satou | G03G 21/206 399/93 |
| 2018/0046124 | A1 * | 2/2018 | Moriya | G03G 15/55 |
| 2019/0187611 | A1 * | 6/2019 | Kawabata | G03G 15/0258 |
| 2025/0123579 | A1 * | 4/2025 | Nakai | G03G 21/1814 |

FOREIGN PATENT DOCUMENTS

| | | | |
|---|---|---|---|
| JP | 2014041191 | A * | 3/2014 |
| JP | 2018-092029 | A | 6/2018 |

* cited by examiner

IMAGE FORMING APPARATUS HAVING ODOR SENSOR FOR DETECTING ODOR DIFFUSING FROM ODOR GENERATOR ON TONER CONTAINER

INCORPORATION BY REFERENCE

This application is based on and claims the benefit of priority from Japanese Patent Application No. 2023-178682 filed on Oct. 17, 2023, the contents of which are hereby incorporated by reference.

BACKGROUND

The present disclosure relates to image forming apparatuses that employ an electrophotographic process, such as copiers and printers, and relates in particular to image forming apparatuses that include a toner storage container that is removably mountable in the image forming apparatus.

Image forming apparatuses that employ an electrophotographic process, such as copiers, printers, and facsimiles, typically use powder developers and commonly employ a process in which an electrostatic latent image formed on an image carrying member such as a photosensitive drum is made visible with toner in a development device and the toner image is transferred onto a recording medium directly or via an intermediate transferring member to be then subjected to fixing.

To reduce the size of the development device, a method is known in which a replaceable toner storage container such as a toner container or a toner cartridge is used to supply toner from outside the development device according to the amount of toner remaining in the development device.

In general, for the toner storage container, print quality is guaranteed through the use of consumables recommended by the vendor of the image forming apparatus (hereinafter referred to as genuine products). For consumables from other than the vendor of the image forming apparatus (hereinafter referred to as non-genuine products), the vendor does not guarantee print quality and does not provide equipment maintenance. However, since many non-genuine products are inexpensive, there are an increasing number of cases where users use non-genuine products despite knowing that they are non-genuine products. As a result, continued use of non-genuine products causes problems such as failure of the image forming apparatus and deterioration of image quality.

SUMMARY

According to one aspect of the present disclosure, an image forming apparatus includes an image forming portion, a toner storage container, an odor generator, an odor sensor, and a control portion. The image forming portion includes an image carrying member and a development device that develops an electrostatic latent image formed on the image carrying member into a toner image, and forms the toner image based on image data. The toner storage container stores toner for forming the toner image, and is removably mountable in a main body of the image forming apparatus. The odor generator is provided on the toner storage container, and carries an odor substance. The odor sensor is provided in the main body of the image forming apparatus, and senses the odor substance diffusing from the odor generator. The control portion identifies the type of toner storage container based on the odor substance sensed by the odor sensor. The toner storage container is rotatable, and the odor generator is provided at a position where it is rotatable together with the toner storage container. The control portion rotates the toner storage container after the toner storage container is mounted in the main body of the image forming apparatus before toner supplying operation is started, and senses the odor substance at a sensing position at which the odor generator is closest to the odor sensor.

DETAILED DESCRIPTION

[1. Overall Configuration of Image Forming Apparatus]

Figure 1:
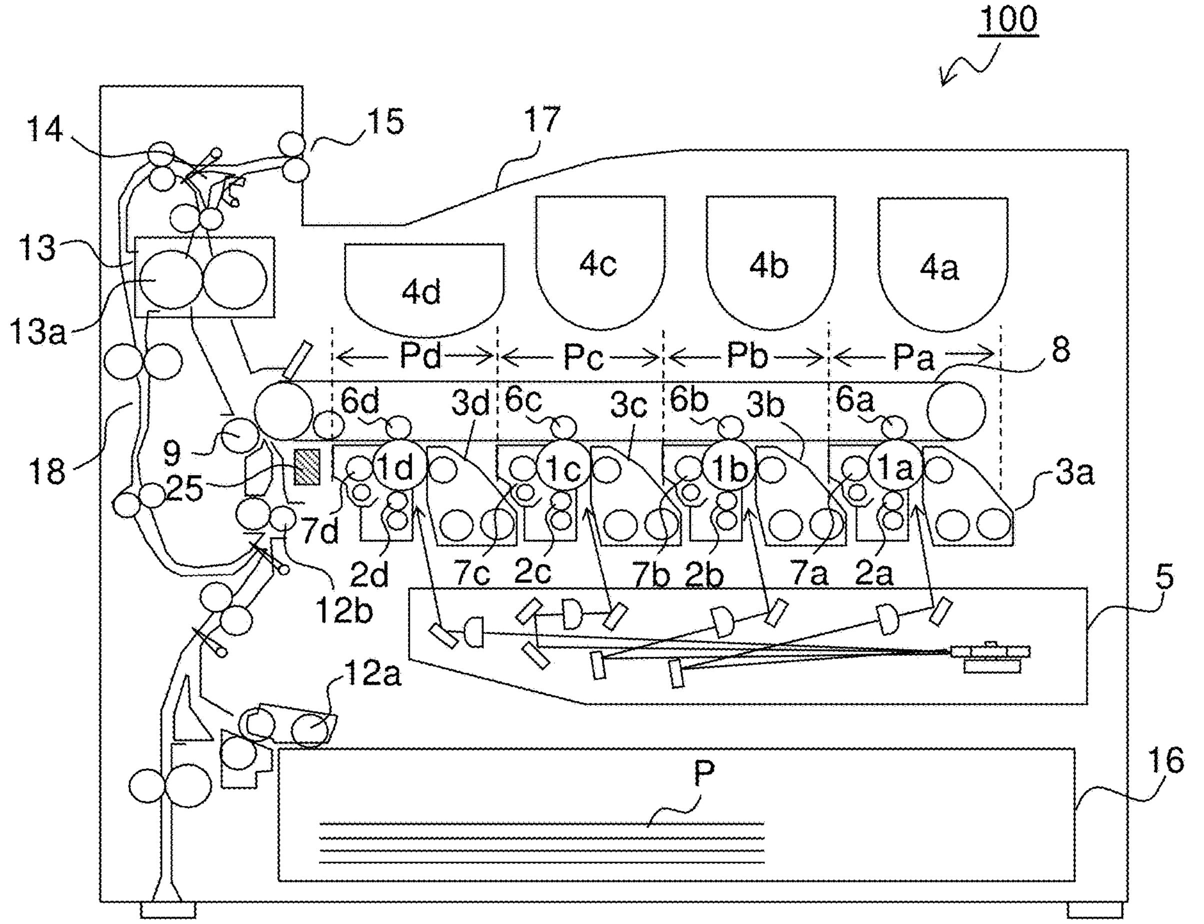
FIG. 1 is a schematic configuration diagram of a color printer according to one embodiment of the present disclosure.

Hereinafter, an embodiment of the present disclosure will be described with reference to the drawings. FIG. 1 is a schematic sectional view of an image forming apparatus according to an embodiment of the present disclosure, showing a tandem color printer. In a main body of the color printer 100, four image forming portions Pa, Pb, Pc, and Pd are arranged in this order from upstream (the right side in FIG. 1) in the conveyance direction. The image forming portions Pa to Pd are provided so as to correspond to images of four different colors (yellow, cyan, magenta, and black). The image forming portions Pa to Pd form yellow, cyan, magenta, and black images sequentially, each through the processes of electrostatic charging, exposure to light, image development, and image transfer.

In these image forming portions Pa to Pd are arranged photosensitive drums 1*a*, 1*b*, 1*c*, and 1*d*, which carry visible images (toner images) of the different colors. An intermediate transfer belt 8 that rotates clockwise in FIG. 1 is provided adjacent to the image forming portions Pa to Pd. A secondary transfer roller 9 is provided adjacent to the intermediate transfer belt 8.

When image data is fed in from a host device such as a personal computer, first, charging devices 2*a* to 2*d* electrostatically charge the surfaces of the photosensitive drums 1*a* to 1*d* uniformly. Next, an exposure device 5 irradiates the photosensitive drums 1*a* to 1*d* with light according to the image data to form on them electrostatic latent images according to the image data. Development devices 3*a* to 3*d* are loaded with predetermined amounts of two-component developer (hereinafter, also referred to simply as developer) containing toner of different colors, namely yellow, cyan, magenta, and black respectively, supplied from toner containers 4*a* to 4*d*. The toner in the developer is fed from the development devices 3*a* to 3*d* to the photosensitive drums 1*a* to 1*d* and electrostatically adheres to them. Thus, toner images are formed according to the electrostatic latent images formed by exposure to light from the exposure device 5.

Then, primary transfer rollers 6*a* to 6*d* apply an electric field at a predetermined transfer voltage between the primary transfer rollers 6*a* to 6*d* and the photosensitive drums 1*a* to 1*d*, and thereby the yellow, cyan, magenta, and black toner images on the photosensitive drums 1*a* to 1*d* are primarily transferred to the intermediate transfer belt 8. The toner and the like remaining on the surfaces of photosensitive drums 1*a* to 1*d* after primary transfer are removed by cleaning devices 7*a* to 7*d*.

A transfer sheet P to which the toner images are to be transferred is stored inside a sheet cassette 16 arranged in a bottom part of the color printer 100. The transfer sheet P is conveyed from the sheet cassette 16 via a sheet feed roller 12*a* and a pair of registration rollers 12*b* to a nip portion (a secondary transfer nip portion) between the secondary transfer roller 9 and the intermediate transfer belt 8 with predetermined timing. The transfer sheet P having the toner images secondarily transferred to it is conveyed to a fixing portion 13.

The transfer sheet P conveyed to the fixing portion 13 is heated and pressed by the pair of fixing rollers 13*a*; thus the toner images are fixed to the surface of the transfer sheet P and a predetermined full-color image is formed. The transfer sheet P having the full-color image formed on it is discharged as it is (or after being diverted to a duplex conveyance passage 18 by a branching portion 14 to have images formed on both sides) to a discharge tray 17 by a pair of discharge rollers 15.

At a position opposite the driving roller 10 across the intermediate transfer belt 8, an image density sensor 25 is arranged. Used as the image density sensor 25 is typically an optical sensor including a light-emitting element such as an LED and a light-receiving element such as a photodiode. When the amount of toner attached to the intermediate transfer belt 8 is measured, measurement light is shone from the light-emitting element to patch images (reference images) formed on the intermediate transfer belt 8. Then the measurement light strikes the light-receiving element as the light reflected from the toner and the light reflected from the belt surface.

The light reflected from the toner and the belt surface contains regularly reflected light and irregularly reflected light. The regularly and irregularly reflected light are split by a polarizing splitting prism to strike separate light-receiving elements respectively. The light-receiving elements photoelectrically convert the regularly and irregularly reflected light into output signals, which are fed to a control portion 90 (see FIG. 5).

From the changes in the output signals for the regularly and irregularly reflected light, the density (amount of toner) and the position of the patch images are sensed. These are compared with a reference density and a reference position that are previously set, and thereby the characteristics value of the development voltage, the position and the timing of the start of exposure by the exposure device 5, and the like are adjusted. In this way, for each color, image density correction and color displacement correction (calibration) are performed.

[2. Identifying Toner Container with Odor Sensor]

Figure 2:
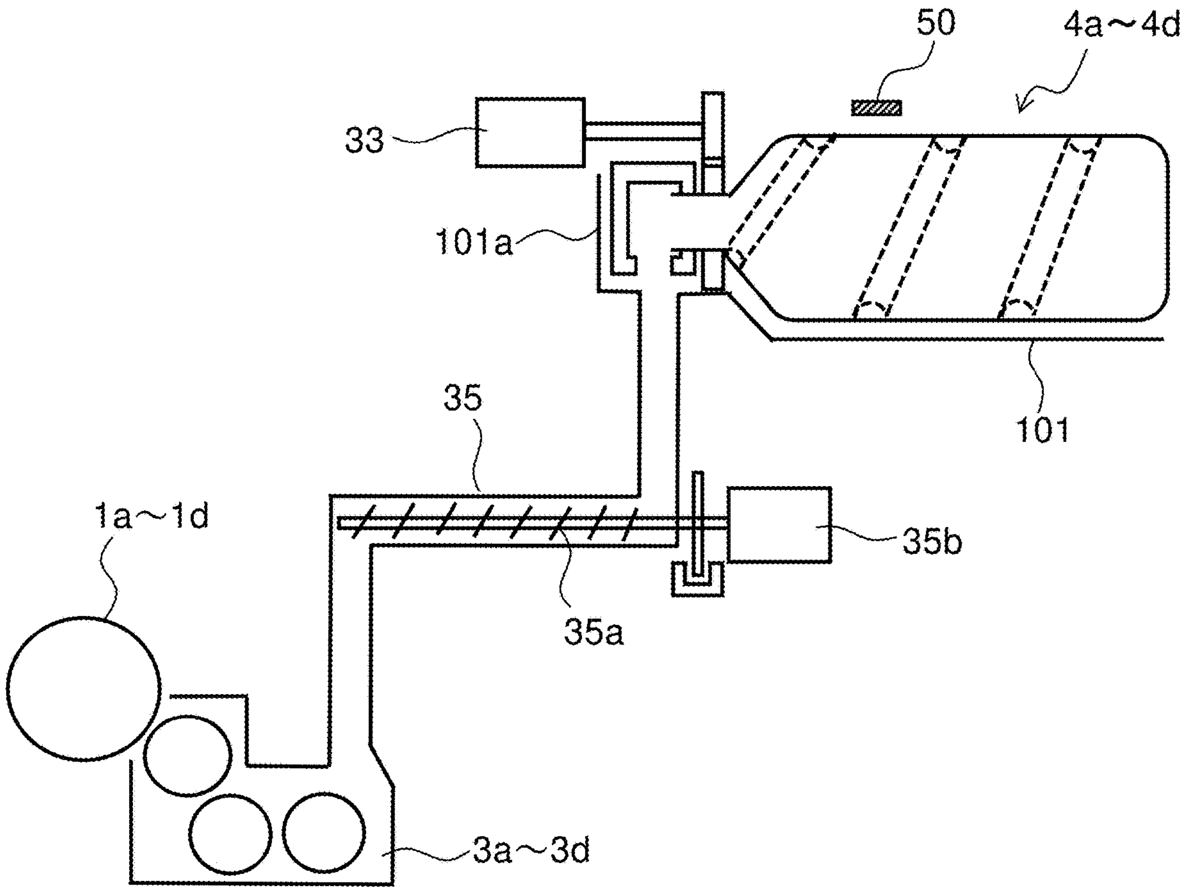
FIG. 2 is a side sectional view of a toner container and a toner supply passage used in the color printer of the embodiment.
Figure 3:
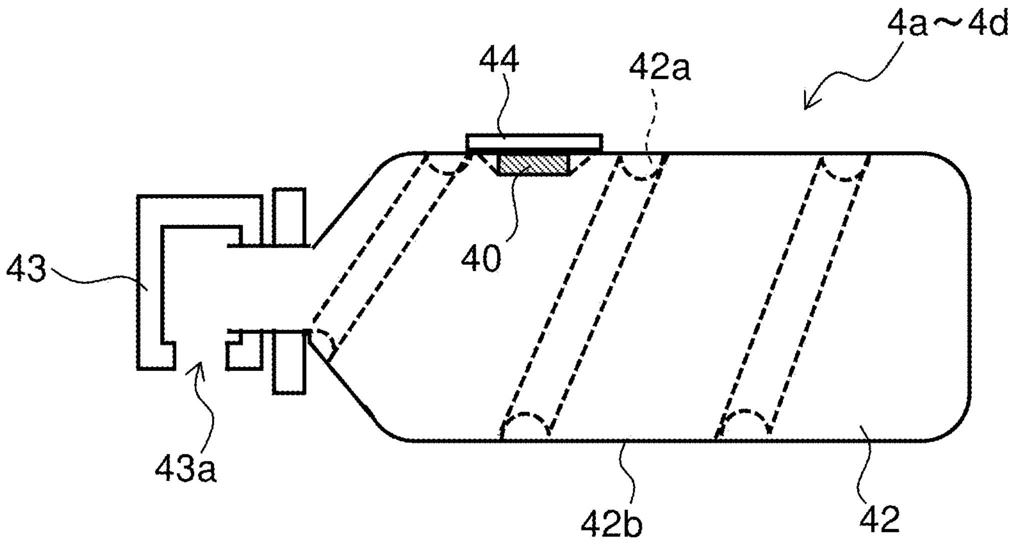
FIG. 3 is a side view of the toner container used in the color printer of the embodiment.
Figure 4:
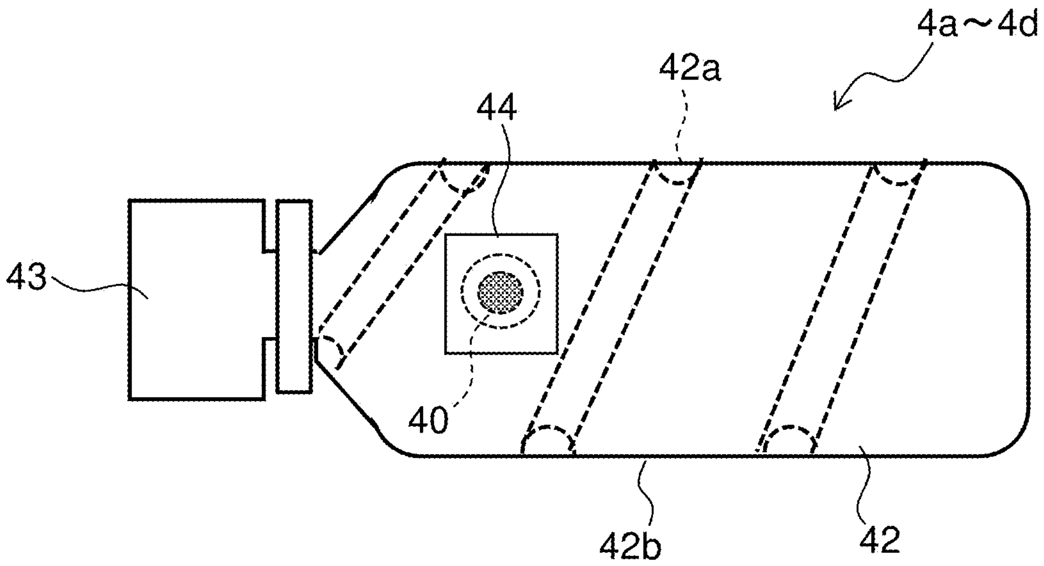
FIG. 4 is a top view of the toner container used in the color printer of the embodiment.

FIG. 2 is a side sectional view of the toner container 4*a* to 4*d* and a toner supply passage used in the color printer 100 of the embodiment. FIGS. 3 and 4 are a side view and a top view, respectively, of the toner container 4*a* to 4*d* used in the color printer 100. The toner containers 4*a* to 4*d* have basically the same structure and accordingly one of them is shown as the toner container 4*a* to 4*d* in FIGS. 3 and 4, and also in FIGS. 5 and 6, which will be referred to later. In this embodiment, rotary toner containers 4*a* to 4*d* are used that themselves rotate to supply toner.

As shown in FIG. 2, the toner containers 4*a* to 4*d* are connected to the development devices 3*a* to 3*d* via a toner supplying pipe (sub hopper) 35. The toner supplying pipe 35 is bent in a crank shape. Inside a horizontal part of the toner supplying pipe 35, a conveyance screw 35*a* is arranged and the conveyance screw 35*a* is coupled to a conveyance motor 35*b*.

As shown in FIGS. 3 and 4, the toner containers 4*a* to 4*d* each have a container body 42 and a fixing portion 43. The container body 42 is configured to be rotatable about a rotation axis extending in the longitudinal direction. The container body 42 stores toner of each color (not shown). On the inner circumferential surface of the container body 42, a conveyance rib 42*a* in a spiral shape is continuously provided. The conveyance rib 42*a* projects inward in the radial direction from the inner circumferential surface of the container body 42. On the outer circumferential surface 42*b* of the container body 42, an odor generator 40 is arranged.

The odor generator 40 has an odor substance impregnated in a base member of a nonwoven fabric or the like. Used as the base material is, for example, a long-fiber nonwoven fabric made of polypropylene or a nonwoven fabric made by directly spinning a polymer of which the main component is sodium polyacrylate.

Specifically, the odor substance is an organic compound that contains a carbon atom and at least one of a hydrogen atom, a nitrogen atom, an oxygen atom, and a sulfur atom and that, with a molecular weight of approximately 20 to 400, evaporates at room temperature (room-temperature-volatile). It may be a compound of which the odor humans cannot smell. Specific examples of compounds usable as odor substances include nerolidol, y-decalactone, ethyl maltol, anisole, stabilized chlorine dioxide, odorless petroleum, linalool, terpineol, allylic ester, sesquiterpene, and green-tea catechin. Examples of compounds of which the odor humans cannot smell include cyclodextrin.

The odor generator 40 has affixed to it a seal member 44 for airtight sealing. The sealing member 44 is formed of a material that is impermeable to the odor substance impregnated in the odor generator 40 and prevents the diffusion of the odor substance during transportation and storage of the toner containers 4*a* to 4*d*. When the toner containers 4*a* to 4*d* are used, after the sealing member 44 is peeled off, the toner containers 4*a* to 4*d* are inserted into the container mounting portion 101.

The fixing portion 43 is mounted on, so as not to be rotatable relative to, a mounting portion 101*a* (see FIG. 2) in the container mounting portion 101. In the fixing portion 43, a toner discharging port 43*a* is formed to be coupled to the toner supplying pipe 35.

Referring back to FIG. 2, near the mounting portion 101*a*, a toner supplying motor 33 is arranged to rotate the container body 42. As the toner supplying motor 33 rotates the container body 42, the toner inside the container body 42 moves toward the fixing portion 43 by the action of the conveyance rib 42*a*, and then the toner falls from the toner discharging port 43*a* into the toner supplying pipe 35. The toner that has fallen into the toner supplying pipe 35 is supplied to the development devices 3*a* to 3*d* as the conveyance screw 35*a* rotates.

In the container mounting portion 101, the odor sensor 50 is arranged at a position facing the odor generator 40. The odor sensor 50 senses the odor substance diffusing from the odor generator 40. The odor sensor 50 will be described in detail later.

In the color printer 100 of this embodiment, the odor sensor 50 senses the odor substances diffusing from the odor generators 40 on the toner containers 4*a* to 4*d* to identify the toner containers 4*a* to 4*d*. Specifically, based on the odor substances sensed by the odor sensor 50, whether the toner containers 4*a* to 4*d* are genuine products is judged. By use of different odor substances for the different colors corresponding to the toner containers 4*a* to 4*d*, the color and type of the toner contained in the toner containers 4*a* to 4*d* can be identified.

According to this embodiment, by identifying the toner containers 4*a* to 4*d* by sensing odor substances that are difficult to imitate, it is possible to identify the types of toner containers 4*a* to 4*d* more accurately than by physical or electrical identification methods such as wireless tags, which can be easily counterfeited. There is no need to add an odor to the toner itself, and this eliminates the risk of a strong odor from images printed with a high print ratio.

Figure 5:
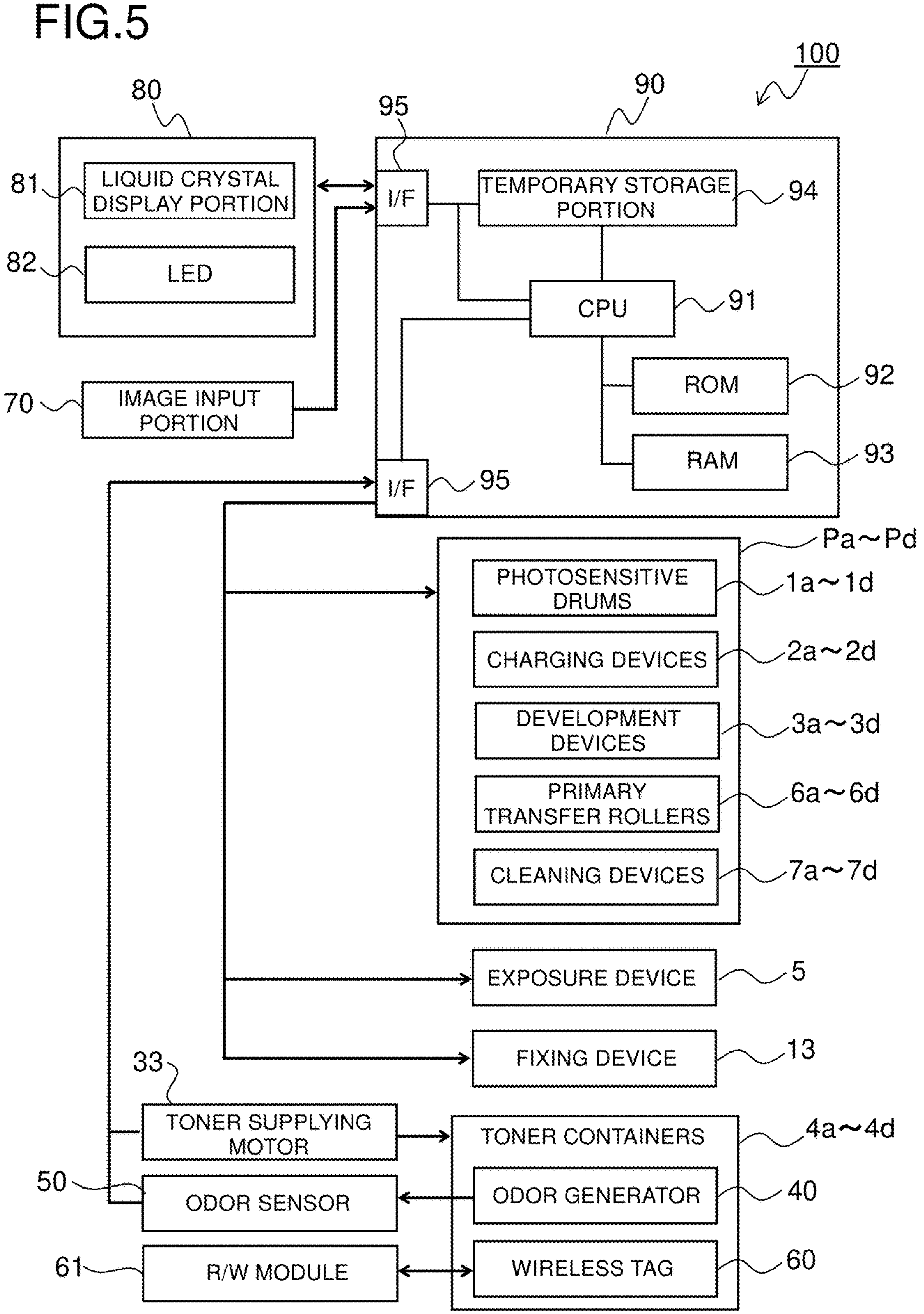
FIG. 5 is a block diagram showing control paths used in the color printer of the first embodiment.

FIG. 5 is a block diagram showing one example of control paths used in the color printer 100 of the embodiment. The control paths in the entire color printer 100 are complicated because various kinds of control are performed in different parts of the apparatus when the color printer 100 is in use. For simplicity's sake, the following description will focus on those control paths that are necessary for implementing the present disclosure. For such parts as have already been described, a simplified or no description will be given.

An image input portion 70 is a reception portion that receives image data transmitted from a personal computer or the like to the color printer 100. An image signal input from the image input portion 70 is converted into a digital signal and is then sent to a temporary storage portion 94. If the image forming apparatus is a copier or a digital multifunction peripheral, the image input portion 70 corresponds to an image reading portion that reads a document image and converts it into image data.

An operation portion 80 is provided with a liquid crystal display portion 81 and LEDs 82 that indicate various states, and indicates the status of the color printer 100, the progress of image formation, and the number of copies printed. Various settings for the color printer 100 are made from a printer driver on the personal computer.

The operation portion 80 is also provided with a start button that is used when the user enters an instruction to start image formation, a stop/clear button that is used chiefly to cancel image formation, and a reset button that is used to get the various settings on the color printer 100 back to the default ones.

The odor sensor 50 senses the odor substance diffusing from the odor generator 40 fitted to the toner containers 4*a* to 4*d* and judges whether the toner containers 4*a* to 4*d* are genuine or non-genuine products as well as the color, type, and the like of the toner contained in the toner containers 4*a* to 4*d*. The information acquired by the odor sensor 50 is stored in a RAM 93.

The odor sensor 50 can be of any type, such as a semiconductor type, a quartz oscillator type, or a membrane-type surface stress (MSS) type; among these, a quartz oscillator type with a sensitive membrane attached to it or a membrane-type surface stress type can sense a plurality of different odors, allowing highly accurate discrimination.

The semiconductor type can be an oxide semiconductor type or an organic semiconductor type. The sensing of odors by the semiconductor-type odor sensors 50 exploits the change in the resistance value of the semiconductor resulting from the molecules of the odor substance being adsorbed onto the semiconductor surface. The quartz crystal oscillator type can be one that uses a natural lipid or one that uses a synthetic lipid. The quartz crystal oscillator type odor sensor 50 has a structure in which an odor-sensing membrane is attached to the surface of an oscillator. When the molecules of the odor substance are adsorbed onto the sensing membrane, the mass of the membrane increases and the resonant frequency of the quartz crystal oscillator decreases. From the amount of this decrease, the mass of the molecules of the odor substance is measured. With the quartz crystal oscillator type, the odor substance that can be sensed changes depending on the type of sensing membrane.

Usable as the odor sensor 50 with necessary improvements made is, for example, as a semiconductor type, XP-329III (manufactured by New Cosmos Electric Co., Ltd.) or OMX-SR (manufactured by Shin-ei Co., Ltd.), or, as a quartz oscillator type, noseStick (manufactured by I-PEX Co., Ltd.).

The toner container 4_a_ to 4_d_ can have a wireless tag 60. The wireless tag 60 stores, in a rewritable manner, information on the toner stored in the toner container 4_a_ to 4_d_ or information on the toner container 4_a_ to 4_d_ itself. The information stored in the wireless tag 60 is read and rewritten by a reader-writer module 61 on the main body of the color printer 100.

The control portion 90 at least includes a CPU (central processing unit) 91 as a central arithmetic processor, a ROM (read-only memory) 92 as a read-only storage portion, a RAM (random-access memory) 93 as a readable and rewritable storage portion, a temporary storage portion 94 that temporarily stores image data and the like, and a plurality of (here, two) I/Fs (interfaces) 95 that transmit control signals to different blocks in the color printer 100 and receive input signals from the operation portion 80.

The ROM 92 stores a control program for the color printer 100 as well as data that are not changed during the use of the color printer 100, such as values necessary for control. The RAM 93 stores necessary data generated in controlling the color printer 100, data temporarily required in controlling the color printer 100, and the like. The temporary storage portion 94 temporarily stores the image signal input from the image input portion 70 and converted into a digital signal.

The control portion 90 transmits control signals from the CPU 91 via the I/Fs 95 to different parts and blocks in the color printer 100. From those parts and blocks, signals indicating their states and input signals are transmitted via the I/Fs 95 to the CPU 91. Examples of the parts and blocks controlled by the control portion 90 include the image forming portions Pa to Pd, the exposure device 5, the fixing portion 13, the reader-writer module 61, the image input portion 70, and the operation portion 80.

The control portion 90 can use information on the toner containers 4_a_ to 4_d_ that is acquired by the odor sensor 50 and stored in the RAM 93 to control the color printer 100. For example, by outputting the information stored in the RAM 93 to the liquid crystal display portion 81 and referring to it on the occasion of a failure or the like of the color printer 100, it is possible to expedite the identification of the cause of the failure.

If the toner containers 4_a_ to 4_d_ are identified as genuine or non-genuine products, the control portion 90 changes, as necessary, the image forming conditions according to the identified toner containers 4_a_ to 4_d_. For example, if the toner containers 4_a_ to 4_d_ are non-genuine products and the image density is lower than the target value, the control portion 90 changes the image forming conditions as by increasing the development voltage.

Or, if the toner containers 4_a_ to 4_d_ are identified as genuine or non-genuine products, the control portion 90 switches, as necessary, the system for sensing the process status to a mode that suits the so identified toner containers 4_a_ to 4_d_.

Figure 6:
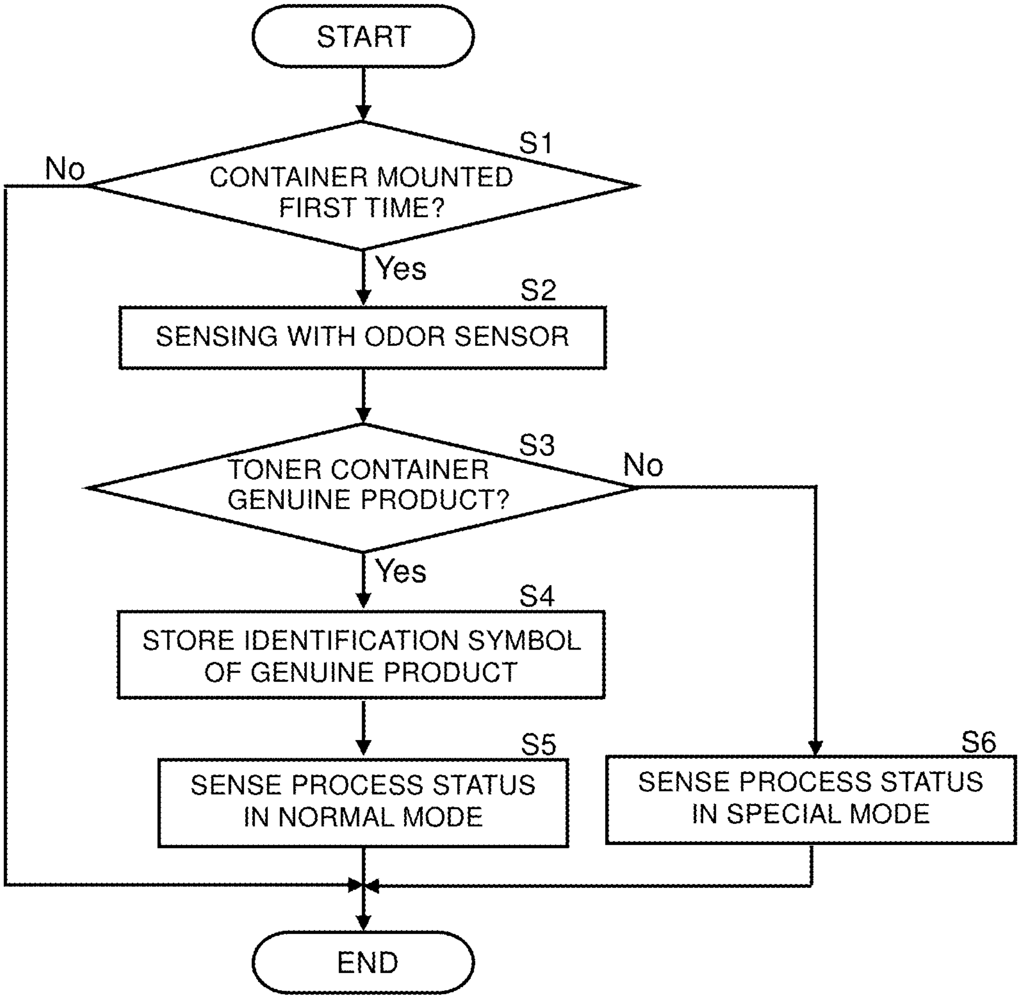
FIG. 6 is a flow chart showing one example of toner container identification and process change control in in the color printer of the first embodiment.

FIG. 6 is a flow chart showing identification of the toner containers 4_a_ to 4_d_ and control for process change on the color printer 100 of the embodiment. Now, a procedure for identifying the toner containers 4_a_ to 4_d_ and changing the process based on the identification results will be described along the steps in FIG. 6 with reference also to FIGS. 1 to 5 as necessary. In the example of control in FIG. 6, it is assumed that the toner containers 4_a_ to 4_d_ are fitted with the wireless tag 60 (see FIG. 5) as a storage device and that the wireless tag 60 has default settings. In the example of control in FIG. 6, and also in the example of control in FIG. 7, which will be described later, it is assumed that whether the toner containers 4_a_ to 4_d_ are genuine products or not is checked individually for each color and that only for a color of which the toner container 4_a_ to 4_d_ is a non-genuine product the process and the calibration conditions are changed.

When a user mounts at least one of the toner containers 4_a_ to 4_d_ in the container mounting portion 101, the control portion 90 checks whether the mounted toner container 4_a_ to 4_d_ is one mounted for the first time (Step S1). If it is one mounted for the first time (Step S1, Yes), the control portion 90 performs sensing operation with the odor sensor 50 (Step S2).

Next, based on the sensing result from the odor sensor 50, the control portion 90 checks whether the mounted toner container 4_a_ to 4_d_ is a genuine product (Step S3). If the mounted toner container 4_a_ to 4_d_ is a genuine product (Step S3, Yes), the control portion 90, using the reader-writer module 61, stores in the wireless tag 60 an identification symbol indicating that the toner container 4_a_ to 4_d_ is a genuine product (Step S4). This identification symbol is stored also in the RAM 93 in the color printer 100. The system for sensing the process status is maintained in a normal mode (Step S5).

By contrast, if a non-genuine product toner container 4_a_ to 4_d_ is mounted (Step S3 No), the control portion 90 switches the system for sensing the process status to a special mode (Step S6). If the toner container 4_a_ to 4_d_ is a non-genuine product, with respect to the toner, nothing is known about its environmental characteristics, transfer/fixing performance, deterioration characteristics, etc. Accordingly, the special mode is selected to perform calibration, image evaluation, and the like to suppress degradation of image quality.

With the example of control in FIG. 6, if the toner container 4_a_ to 4_d_ is a non-genuine product, the process status is sensed in the special mode. This helps minimize degradation of image quality resulting from the use of non-genuine toner. On the other hand, if the toner container 4_a_ to 4_d_ is a genuine product, an identification symbol is stored in both the toner container 4_a_ to 4_d_ and the color printer 100. This permits accurate identification, by use of the stored identification symbol, of the toner container 4_a_ to 4_d_ that is mounted and removed after the first-time mounting of the toner containers 4_a_ to 4_d_.

Genuine product toner containers 4_a_ to 4_d_ can be identified in more detail in the following manner. For example, the color printer 100 can be used for ordinary color printing and can also be used as a monochrome printer with black toner containers used as all of the toner containers 4_a_ to 4_d_. Here, between color printing and monochrome printing, image formation conditions differ (such as the surface potential on the photosensitive drums 1_a_ to 1_d_, the development voltage, light exposure conditions, etc.). To cope with that, if a user mounts black toner containers as the toner containers 4_a_ to 4_c_, the control portion 90 recognizes that and automatically changes image formation conditions and calibration conditions. By further acquiring the value of the reflection density of the toner image on the intermediate transfer belt 8 with the image density sensor 25 (see FIG. 1), it is also possible to check the refreshing state of the toner.

Also possible is, on the occasion of maintenance, to mount a maintenance-dedicated toner container with the odor generator 40 impregnated with a different odor substance. This permits the control portion 90 to recognize, with the odor sensor 50, that maintenance is underway. Moreover, by storing the output value from the odor sensor 50 as acquired on sensing the odor substance from the maintenance-dedicated toner container, it is possible to calibrate the odor sensor 50 by use of the maintenance-dedicated toner container.

Figure 7:
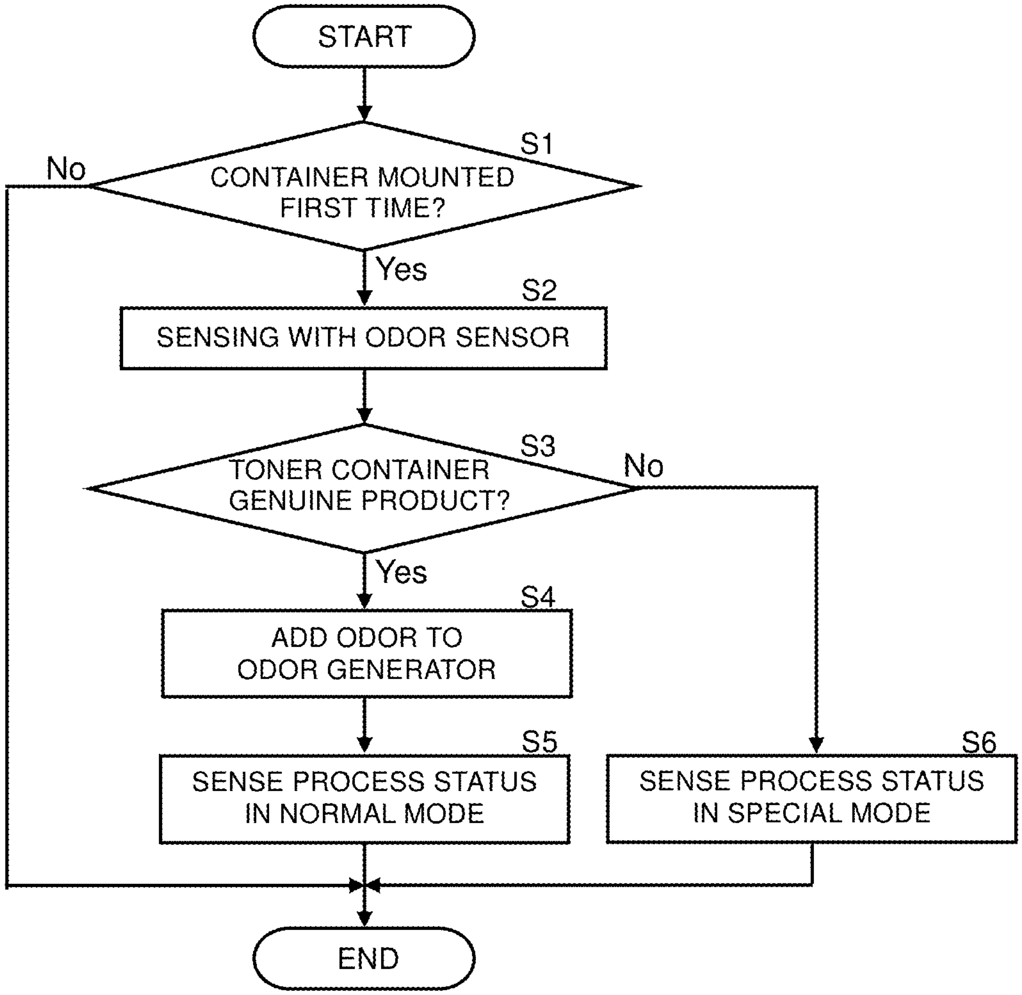
FIG. 7 is a flow chart showing another example of toner container identification and process change control in in the color printer of the first embodiment.

FIG. 7 is a flow chart showing another example of identification of the toner containers 4*a* to 4*d* and control for process change on the color printer 100. In the example of control in FIG. 7, the color printer 100 includes an odor adding device (not illustrated). If the proper odor substance is sensed from the mounted toner container 4*a* to 4*d*, that is, if the mounted toner container 4*a* to 4*d* is identified as a genuine product (Step S3, Yes), the odor substance is added to the odor generator 40 on the toner container 4*a* to 4*d* (Step S4). By contrast, if the mounted toner container 4*a* to 4*d* is identified as a non-genuine product (Step 3, No), no odor substance is added.

In the example of control in FIG. 7, if the toner container 4*a* to 4*d* is a genuine product, the odor substance is added to the odor generator 40 and this prevents a decrease of the odor substance that diffuses from the odor generator 40. This permits accurate identification of the toner containers 4*a* to 4*d* for a long period. The odor substance added to the odor generator 40 can be the same as, or different from, the one with which the odor generator 40 is initially impregnated. Adding a different odor substance results in changing the odor substance sensed by the odor sensor 50, and this makes the odor generator 40 more difficult to counterfeit (imitate). Moreover, changing to an odor substance different from the initial one makes it easy to judge that the toner container 4*a* to 4*d* is not a new one.

Figure 8:
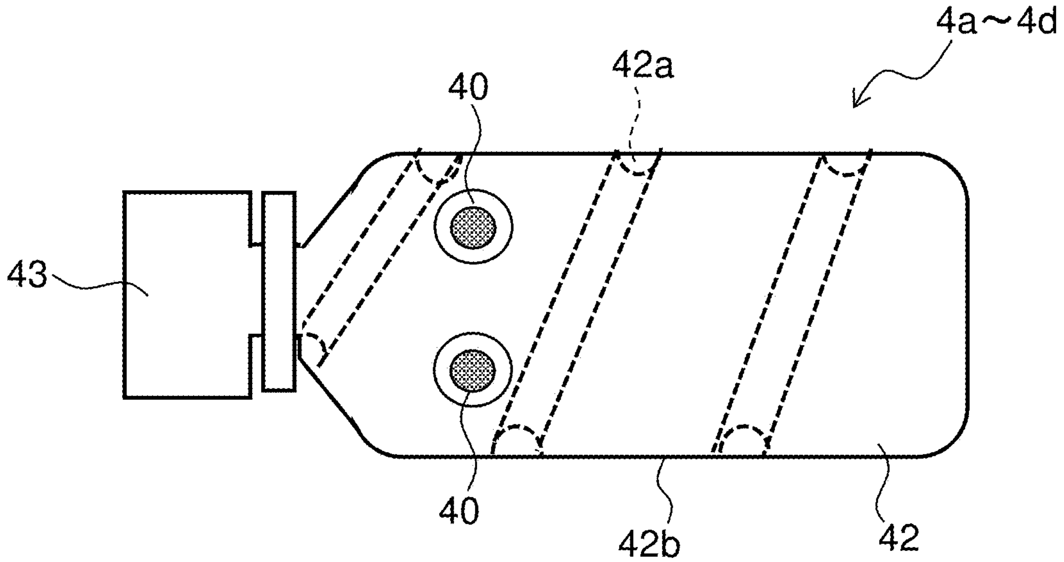
FIG. 8 is a plan view, as seen from above, of another example of the toner container in the color printer of the first embodiment, showing a configuration in which the toner container includes two odor generators.

FIG. 8 is a plan view, as seen from above, of another example of the toner container 4*a* to 4*d* in the color printer 100, showing a configuration where the toner container 4*a* to 4*d* is provided with two odor generators 40.

Arranging two odor generators 40 on the toner container 4*a* to 4*d* permits measurement of two types of odor substances. For example, by using different odor substances in the two odor generators 40, it is possible, with one odor generator 40, to sense whether the toner container 4*a* to 4*d* is a genuine or non-genuine product and, with the other odor generator 40, to acquire information such as the color of the toner and the manufacturing date of the toner. In a case where, as shown in FIG. 8, the odor generators 40 are arranged in a row along the circumferential direction of the container body 42, by rotating the container body 42 such that the odor generators 40 face the odor sensor 50 one after the other, it is possible to sense the odor substances from those odor generators 40.

In a case where the odor generators 40 are arranged in a row along the axial direction (longitudinal direction) of the container body 42, by moving the odor sensor 50 in the axial direction of the container body 42, it is possible to sense the odor substances with one odor sensor 50. With an odor sensor 50 employing a sensitive membrane, moving the odor sensor 50 is expected to encourage the molecules of the odor substance attached to the sensitive membrane to desorb and thereby permit the sensitive membrane to recover its sensing performance. While here two odor generators 40 are arranged, three or more odor generators 40 can be arranged.

[3. Phase Control for Toner Container During Odor Sensing with Odor Sensor]

Figure 9:
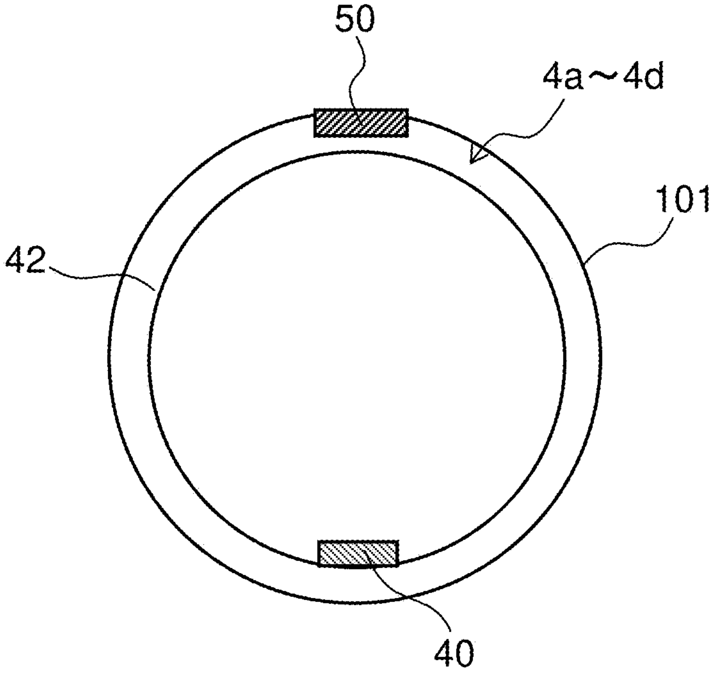
FIG. 9 is a sectional view of the toner container inserted in a container mounting portion as cut in a direction orthogonal to the rotation axis, showing an odor generator arranged at the side opposite from the odor sensor.

As shown in FIGS. 3 and 4, in a construction where the odor generator 40 is arranged on the outer circumferential surface 42*b* of the container body 42, when the toner container 4*a* to 4*d* is mounted in the container mounting portion 101, the odor generator 40 is not always located near the odor sensor 50. For example, it can happen that, as shown in FIG. 9, the odor sensor 50 is located at the top of the container mounting portion 101 while the odor generator 40 on the toner container 4*a* to 4*d* is located opposite from it (at the bottom).

Figure 10:
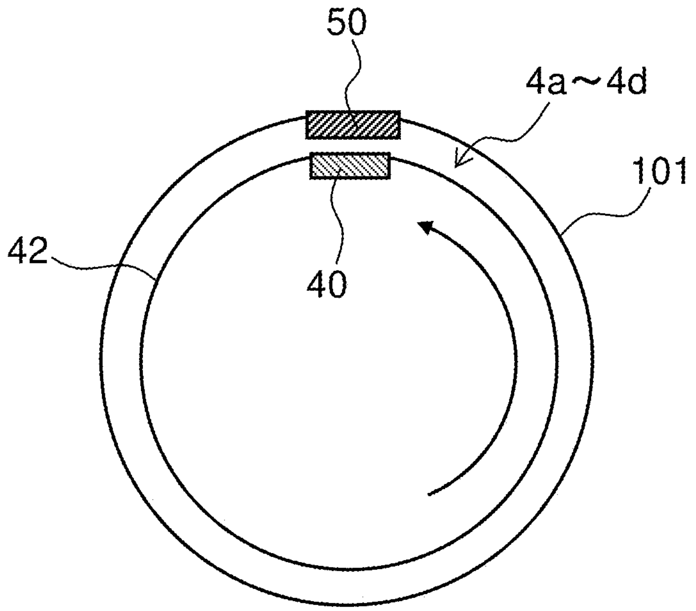
FIG. 10 is a sectional view of the toner container inserted in a container mounting portion as cut in a direction orthogonal to the rotation axis, showing an odor generator arranged at a position facing the odor sensor.
Figure 11:
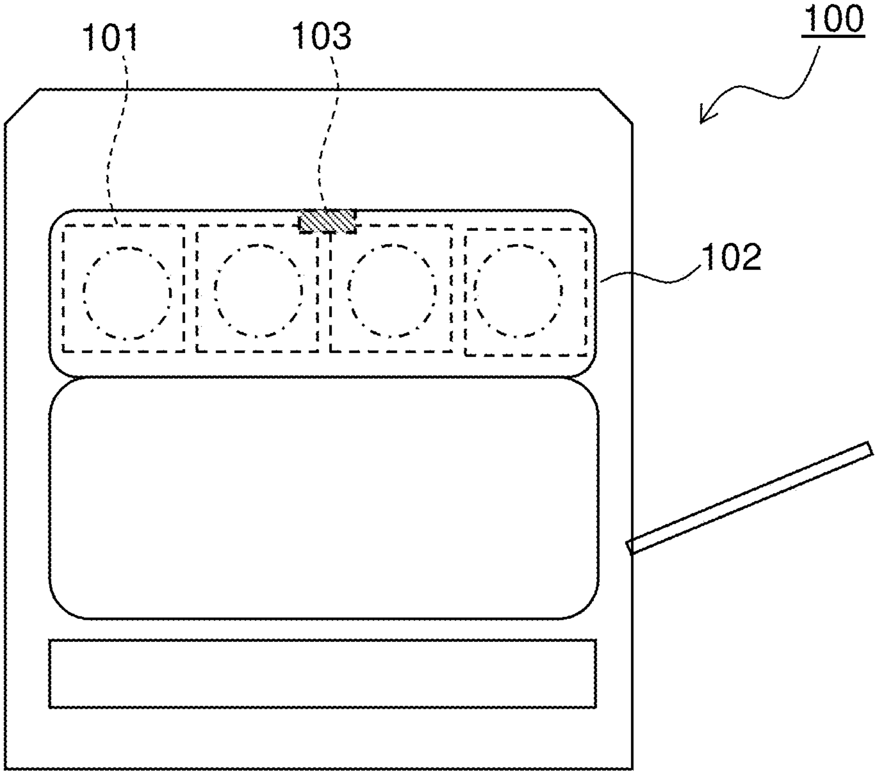
FIG. 11 is a rear view of the color printer.

To cope with that, after the toner container 4*a* to 4*d* is mounted, before printing is started (before toner supplying operation is started in response to a toner supply signal), the container body 42 is rotated. When during the rotation of the container body 42 the sensing output from the odor sensor 50 becomes maximal, as shown in FIG. 10, the odor sensor 50 and the odor generator 40 face each other, with the odor generator 40 at a position (sensing position) closest to the odor sensor 50; that is, the distance between the odor sensor 50 and the odor generator 40 becomes equal to a predetermined distance that is previously set. At the position where the sensing output from the odor sensor 50 is maximal, the rotation of the container body 42 is stopped; then the odor substance from the odor generator 40 can be sensed and the toner container 4*a* to 4*d* can be identified.

Note that rotating the container body 42 causes toner to be discharged from the toner container 4*a* to 4*d*. In a construction where, as shown in FIG. 2, the toner supply pipe 35 is provided between the toner container 4*a* to 4*d* and the development device 3*a* to 3*d*, even if toner is discharged from the toner container 4*a* to 4*d* it simply collects in the toner supply pipe 35 and thus the toner concentration in the development device 3*a* to 3*d* does not increase. However, in a construction without a toner supply pipe 35, the toner discharged from the toner container 4*a* to 4*d* is immediately supplied to the development device 3*a* to 3*d*.

If the developer capacity of the development device 3*a* to 3*d* is so large or the amount of toner supplied is so small that only a limited effect is likely to result, the odor substance can be sensed with toner left being supplied. However, if the supply of toner is likely to have a notable effect, it is preferable to sense the odor substance while limiting the number of turns of the toner container 4*a* to 4*d* (to five turns or less) or reversely rotating the toner container 4*a* to 4*d*. When the toner container 4*a* to 4*d* is rotated reversely, the conveying rib 42*a* does not move toner; thus the odor substance can be sensed with no toner discharged from the toner container 4*a* to 4*d*.

When no sensing of the odor substance is performed, as shown in FIG. 9, the toner container 4*a* to 4*d* is stopped at a position (standby position) where the odor generator 40 is located farthest away from the odor sensor 50, that is, opposite from the odor sensor 50 across the rotation axis of the toner container 4*a* to 4*d*. This makes it difficult for the molecules of the odor substance diffused from the odor generator 40 to reach the odor sensor 50. As a result, the odor sensor 50 can be kept in surroundings low in the odor substance, so it is possible to prevent adhesion of the odor substance to the odor sensor 50 and to prevent deterioration of the odor sensor 50, thereby extending the life of the odor sensor 50.

Figure 20:
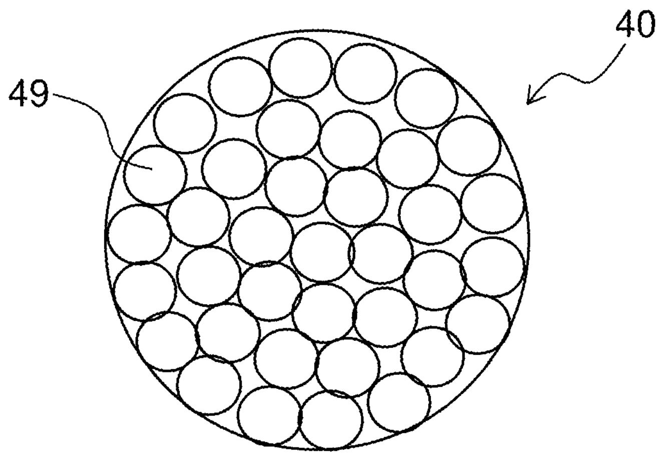
FIG. 20 is a schematic diagram of an odor generator configured with superabsorbent beads.

The timing to sense the odor substance with the odor sensor 50 can be when the toner containers 4*a* to 4*d* are replaced. The replacement of the toner containers 4*a* to 4*d* can be sensed by use of an open/closed signal with respect to a container cover 102, as shown in FIG. 20, that opens and closes the container mounting portion 101 when the toner containers 4*a* to 4*d* are inserted or removed. The container cover 102 is provided so as to be openable and closable at the rear of the color printer 100 and the container mounting portion 101 is fitted with, at a position at which it makes contact with the container cover 102, an open/closed sensing switch 103. When the container cover 102 is opened and closed, an open/closed signal is transmitted from the open/closed sensing switch 103 to the control portion 90 (see FIG. 5).

However, when the power to the color printer 100 is off, whether the container cover 102 is open or closed cannot be recognized. To cope with that, assuming that the toner containers 4*a* to 4*d* may have been inserted with the power off, the odor substance may be sensed when the power to the color printer 100 is turned on. If the container cover 102 can be locked except when the toner containers 4*a* to 4*d* need to be replaced, there is no need to sense the odor substance when the power is turned on.

Instead, the replacement of the toner containers 4*a* to 4*d* may be checked by the user. The odor sensing operation after reception of an open/closed signal with respect to the container cover 102 or at the power-on of the color printer 100 may be limited to after occurrence of an empty signal for the toner containers 4*a* to 4*d*. If a plurality of toner containers 4*a* to 4*d* have been newly mounted, sensing may be performed with the replaced toner containers 4*a* to 4*d* rotated simultaneously; or to prevent the influence of the odor generators 40 on the other toner containers 4*a* to 4*d*, the odor substance may be sensed with the replaced toner containers 4*a* to 4*d* rotated one by one. Table 1 shows an example of situations in which to sense the odor substance and the toner containers targeted for sensing.

TABLE 1

| Situation | Target for sensing |
|---|---|
| At initial installation of color printer | All toner containers |
| At replacement of toner containers | Replaced toner containers |
| At recovery from maintenance | All toner containers |
| At power-on | All toner containers |

Figure 12:
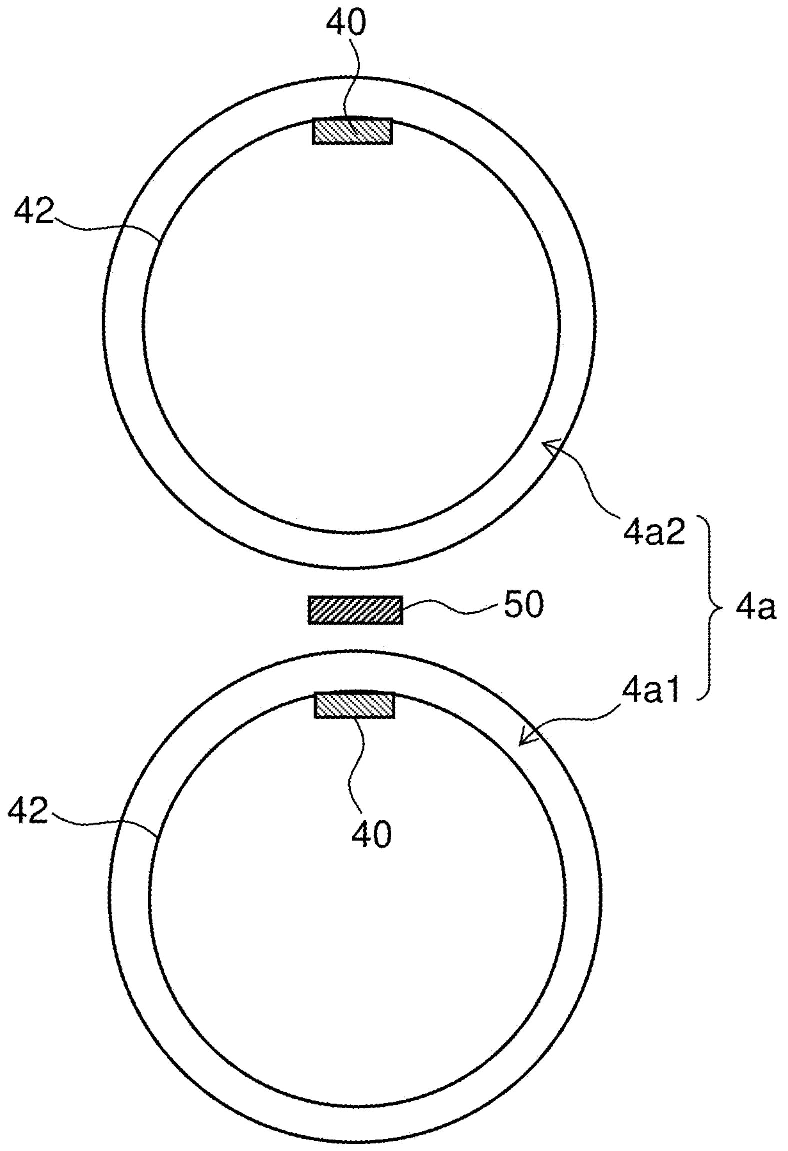
FIG. 12 shows a modified example of the toner container used in the color printer of the embodiment, showing a configuration where the toner container is composed of a first container and a second container.

FIG. 12 is a diagram showing, as a modified example of the toner container 4*a* to 4*d* used in the color printer 100, a configuration where a toner container 4*a* to 4*d* is composed of a first container 4*al* and a second container 4*a*2. In FIG. 12, the first container 4*al* at the bottom is a toner container in use and the second container 4*a*2 at the top is a toner container on standby (backup). Though not illustrated, the toner containers 4*b* to 4*d* are each likewise composed of a first container 4*b*1 to 4*d*1 and a second container 4*b*2 to 4*d*2.

In the configuration in FIG. 12, the first and second containers 4*al* and 4*a*2 have their odor generators 40 impregnated with the same odor substance, with the odor generators 40 arranged at the same position in the longitudinal direction of the container bodies 42. The odor substance is sensed with one odor sensor 50 arranged between the first and second containers 4*a*1 and 4*a*2.

As shown in FIG. 12, the odor generator 40 of the second container 4*a*2 not in use is preferably kept at rest at a position (standby position) farthest away from the odor sensor 50. This is achieved, when the second container 4*a*2 is inserted in the container mounting portion 101, by rotating the second container 4*a*2 to check where on the second container 4*a*2 the odor generator 40 is located and then stopping it at the position farthest away from the odor sensor 50. It is thus possible to accurately sense with the odor sensor 50 the odor substance diffusing from the odor generator 40 on the first container 4*al* without being affected by the odor generator 40 on the second container 4*a*2.

Figure 13:
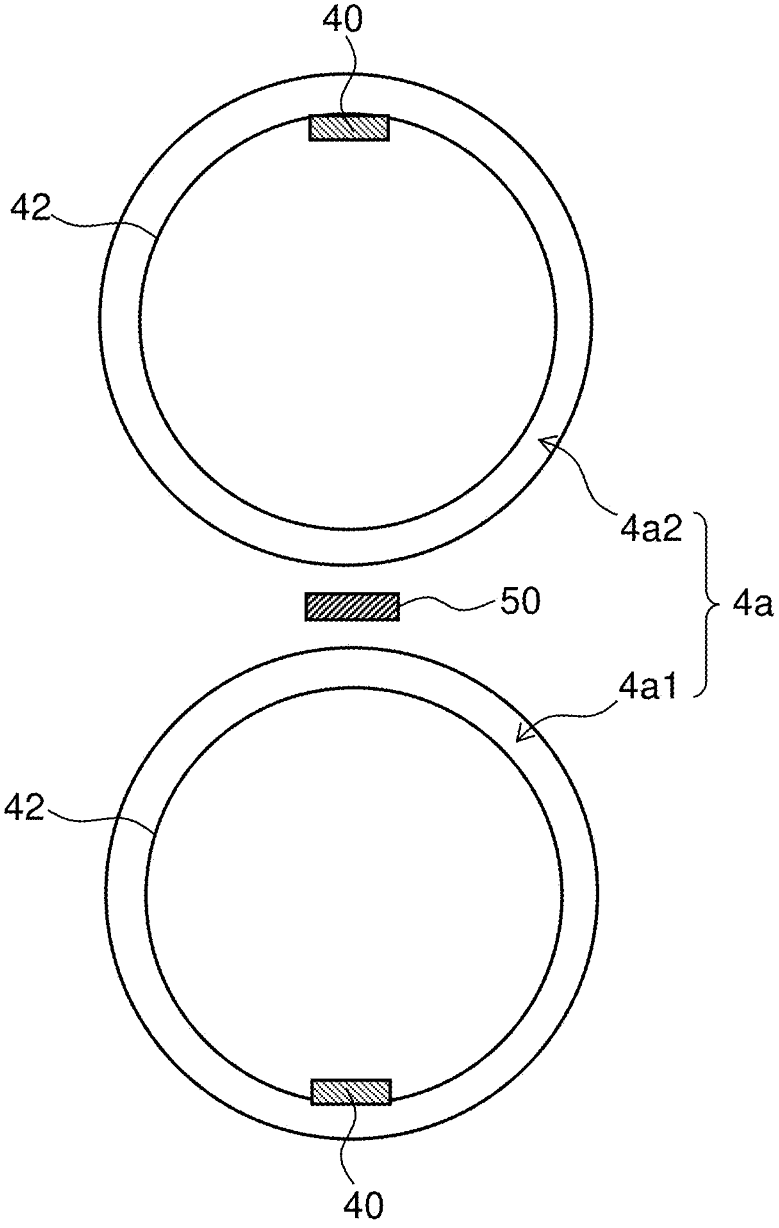
FIG. 13 is a diagram showing, with the second container rotated 180° from what is shown in FIG. 12, the odor sensor not being sensed.

The above operation can be performed with the first container 4*al* in use. If no sensing with the odor sensor 50 of the odor substance from the odor generator 40 on the first container 4*a*1 is performed, as shown in FIG. 13, the odor generators 40 of both the first and second containers 4*al* and 4*a*2 are kept at rest at positions far from the odor sensor 50. This helps suppress attachment of the odor substance to, and hence suppress reduction of the sensitivity of, the odor sensor 50.

[4. Other Configurations]

Figure 14:
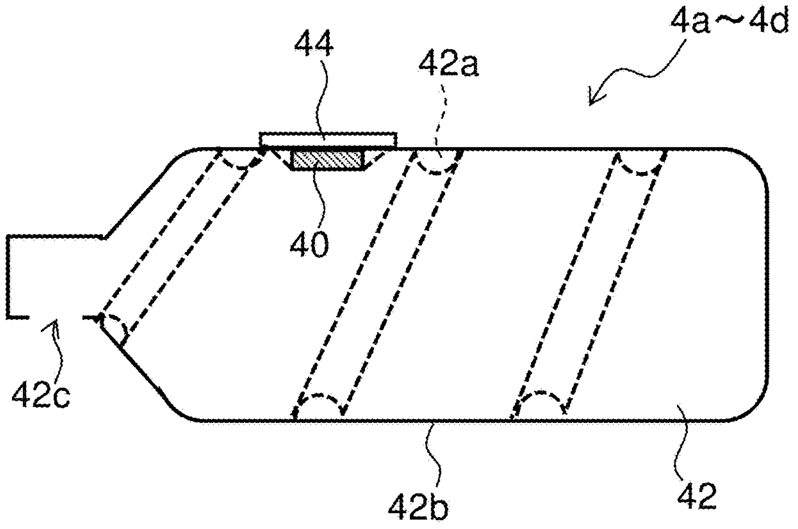
FIG. 14 is a side view showing another example of the toner container mounted in the color printer of the embodiment.

FIG. 14 is a side view of yet another example of the toner containers 4*a* to 4*d* mounted in the color printer 100 of the embodiment. The toner containers 4*a* to 4*d* shown in FIG. 14 are composed only of a container body 42 and do not have a fixing portion 43 (see FIGS. 3 and 4). In the container body 42, a toner discharging port 42*c* is formed. In other respects, the structure here is similar to that of the toner containers 4*a* to 4*d* shown in FIGS. 3 and 4. When toner is supplied, the entire toner containers 4*a* to 4*d* rotate and only when the toner discharging port 42*c* faces down, toner is discharged through the toner discharging port 42*c*.

Figure 15:
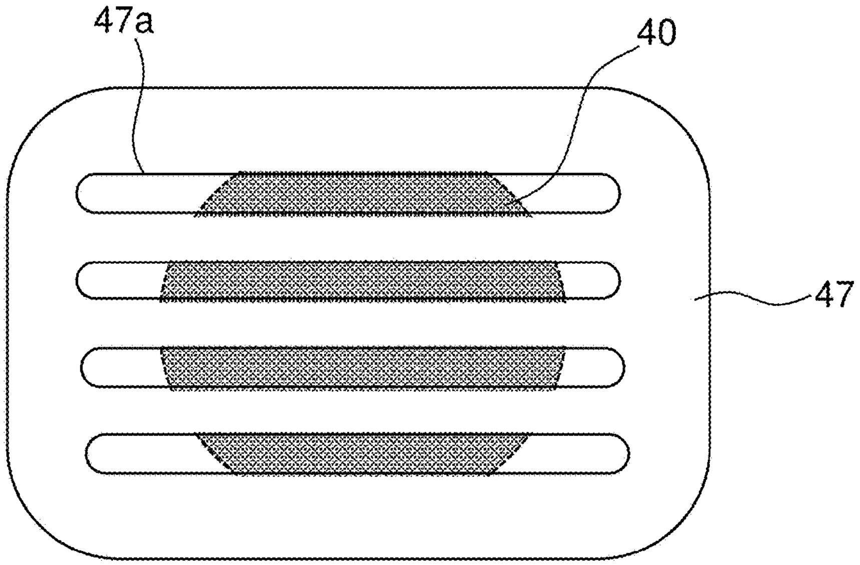
FIG. 15 is a plan view showing an example where the odor generator is provided with a protection member.
Figure 16:
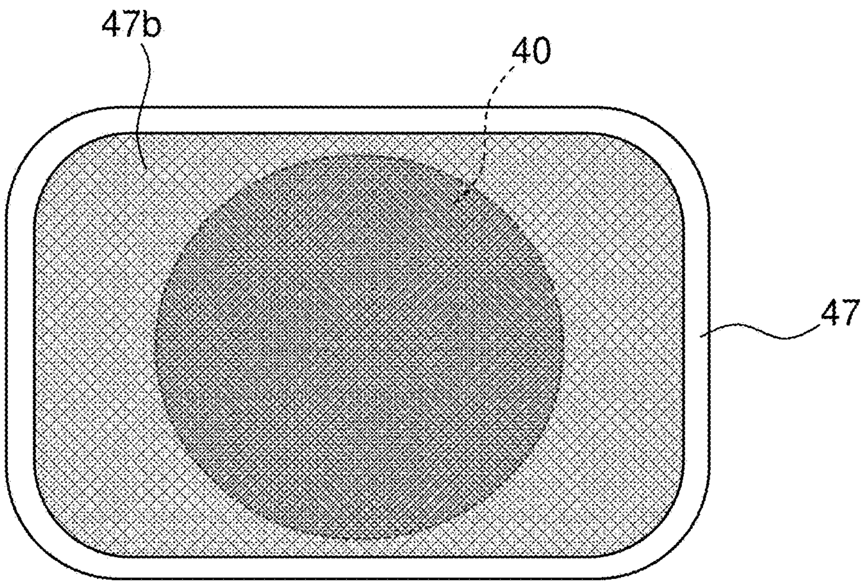
FIG. 16 is a plan view showing another example where the odor generator is provided with a protection member.

As shown in FIGS. 15 and 16, a protection member 47 may be provided to protect the surface of the odor generator 40. This is to prevent the odor generator 40 from being touched accidentally when the toner containers 4*a* to 4*d* are handled and to prevent other substances from adhering to the odor generator 40. In the protection member 47 shown in FIG. 15, slits 47*a* are formed and the odor substance diffuses through the slits 47*a*. In the protection member 47 shown in FIG. 16, the odor generator 40 is covered with a nonwoven fabric 47*b* and the odor substance diffuses through the nonwoven fabric 47*b*.

Figure 17:
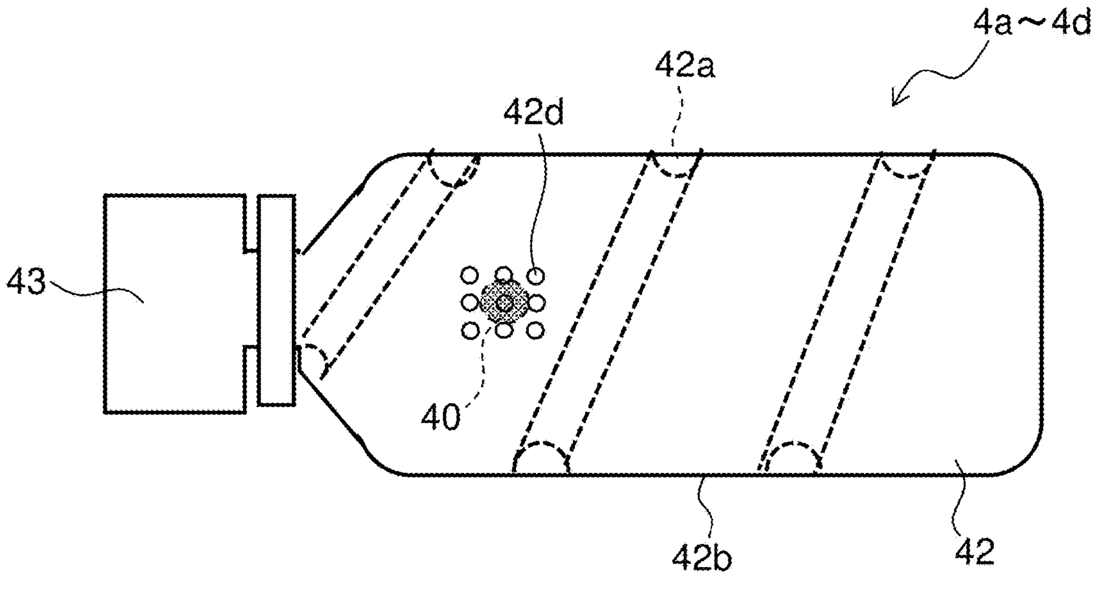
FIG. 17 is a top view of a toner container having an odor generator arranged on the inner circumferential surface of the container body, with through-holes formed in the container body.
Figure 18:
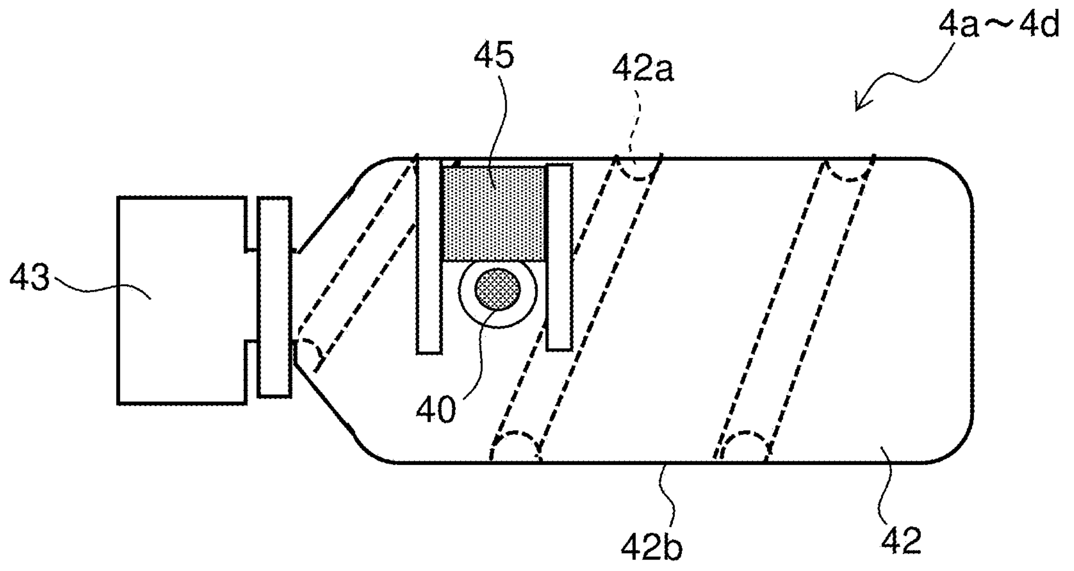
FIG. 18 is a top view of a toner container having an odor generator arranged on the outer circumferential surface of the container body, with the odor generator provided with an openable-closable shutter.

FIG. 17 shows a configuration where an odor generator 40 is arranged on the inner surface of the container body 42 and the odor substance diffuses via through-holes 42*d* formed in the container body 42. In the configuration in FIG. 17, the container body 42 itself has the function of the protection member 47. If as shown in FIG. 18 a shutter 45 that can open and close the odor generator 40 is attached to the toner containers 4*a* to 4*d*, the shutter 45 functions also as the protection member 47.

Figure 19:
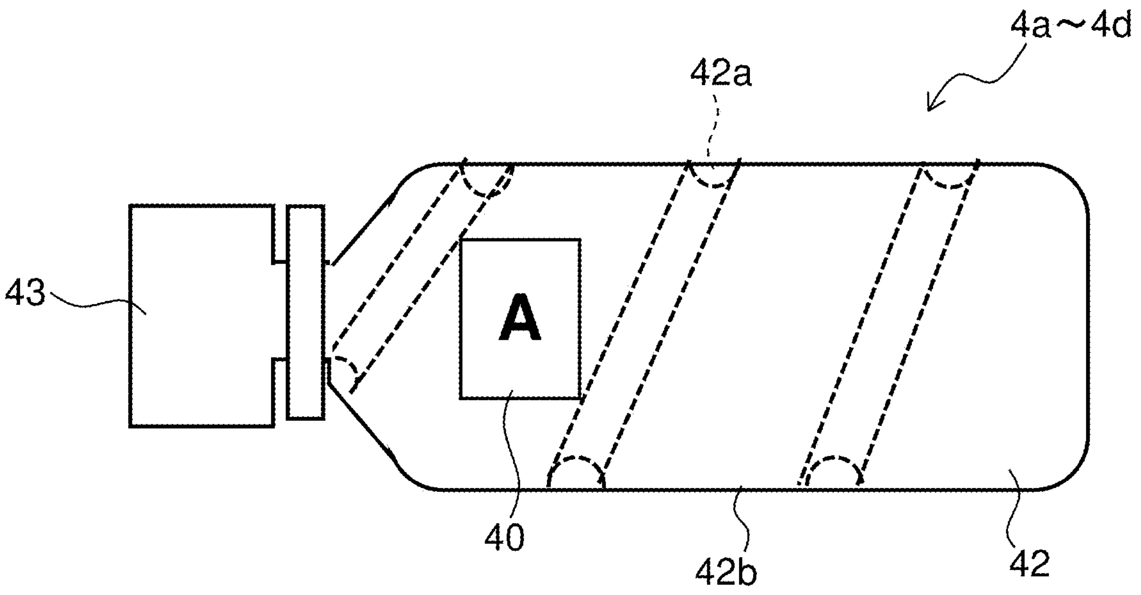
FIG. 19 is a top view of a toner container having a label-type odor generator arranged on the outer circumferential surface of the container body.

FIG. 19 is a top view of the toner containers 4*a* to 4*d* in which a label-type odor generator 40 is arranged on the outer circumferential surface 42*b* of the container body 42. In the odor generator 40, an odor substance (for example, an oil-based fragrance) is encapsulated in microcapsules of about 1 to 5 μm and a label having a letter or symbol printed on it with ink having the microcapsules dispersed in it is attached to the outer circumferential surface 42*b* of the container body 42 of the toner containers 4*a* to 4*d*. The shell (outer layer) of the microcapsules can be gelatin film, melamine film, urethane film, or the like, among which, in terms of ease of handling, urethane film is preferable.

On the container mounting portion 101, a rubbing member (not shown) is provided so that, when the toner containers 4*a* to 4*d* are inserted into the container mounting portion 101 or when the toner containers 4*a* to 4*d* rotate, the microcapsules are crushed by the rubbing member and the odor substances are diffused. With this configuration, the odor generator 40 can be fabricated easily by printing it simply with ink containing microcapsules. There is no need for the sealing member 44 (see FIG. 3) required for preventing the diffusion of the odor substance during transportation and storage of the toner containers 4*a* to 4*d*, and the odor substance can be changed easily by simply changing labels. This permits the odor generator 40 to be used more conveniently.

When the sealing member 44 for preventing the diffusion of the odor substance is used, if the sealing member 44 peels off during transportation or storage, the level of the odor substance decreases. Thus, when the toner containers 4*a* to 4*d* with the sealing member 44 peeled off are mounted in the container mounting portion 101, one may mistake that used toner containers 4*a* to 4*d* are mounted. By contrast, when the label-type odor generator 40 is used, there is no such risk.

Instead of the sealing member 44, capsules may be used. Specifically, the odor generator 40 itself is configured as a collection of capsules in which the odor substance is encapsulated and, when the odor sensor 50 senses the odor, the capsules are broken to diffuse the odor substance. The capsules are made of a resin material that is impermeable to the odor substance.

FIG. 20 is a schematic diagram of an odor generator 40 configured with superabsorbent beads 49. The superabsorbent beads 49 can be formed of, for example, a cross-linked polyacrylate. Impregnating the superabsorbent beads 49 with the odor substance enhances retention capacity for the odor substance. Furthermore, adding a polyolefin resin to resin pellets containing the odor substance and molding them into a bar shape with a three-dimensional structure permits the odor substance to bleed across the surface of the three-dimensional structure so as to volatilize from the surface of the three-dimensional structure for a long period of time.

Based on a decrease of the odor substances sensed by the odor sensor 50, it is also possible to predict the state of the toner in the toner containers 4*a* to 4*d*. The odor substance tends to diffuse easily when the ambient temperature is high and tends to diffuse easily also when the ambient humidity is low. That is, the higher the temperature and the lower the humidity in the environment, the easier the odor substance diffuses and the faster the odor substance decreases. By contrast, the lower the temperature and the higher the humidity in the environment, the slower the odor substance decreases. Depending on the type of toner external additive, in a high-temperature and low-humidity environment, the toner external additive is likely to be buried or separated and this tends to degrade the performance of toner. By contrast, in a low-temperature and high-humidity environment, it is easy to maintain the performance of toner. Thus, based on the degree of decrease of the odor substances, the state of the toner can be predicted to some extent.

Figure 21:
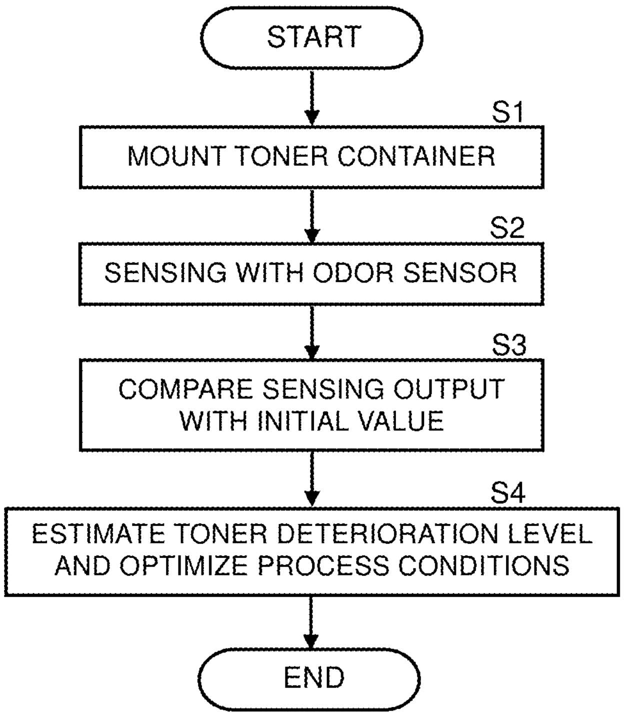
FIG. 21 is a flow chart of an example of toner deterioration level estimation and process condition control based on a decrease of an odor substance.

FIG. 21 is a flow chart showing an example of toner deterioration level estimation and process condition control based on a decrease of an odor substance. When the toner container 4*a* to 4*d* is mounted (Step S1), the control portion 90 performs odor substance sensing operation with the odor sensor 50 (Step S2). The control portion 90 then compares the sensing output value for the odor substance with an initial value (with no decrease) stored in the RAM 93.

Based on the result of the comparison at Step S3, the control portion 90 estimates the deterioration level of the toner and optimizes the process conditions (Step S4). For example, if the odor substance exhibits a large decrease compared with the initial value, the toner is estimated to have deteriorated considerably; accordingly, operation for forcible ejection of toner from the development device 3*a* to 3*d* is performed more frequently than usual.

If the odor sensor 50 cannot sense the odor substance, for example, the toner containers 4*a* to 4*d* may be failing to rotate properly, the odor sensor 50 may be broken, or the sealing member 44 covering the odor generator 40 on the toner containers 4*a* to 4*d* may not have been peeled off. To cope with that, if the odor substance cannot be sensed when the new toner containers 4*a* to 4*d* are mounted, it is preferable to indicate a notification on the liquid crystal display portion 81 (see FIG. 6) to prompt the user to make sure to have peeled off the sealing member 44.

If the odor generator 40 can retain the odor substance for a long period of time, by letting it retain an odor substance that is fragrant, insect-repellent, deodorizing, or the like, it is possible to achieve secondary effects such as an aroma effect, insect-repellent effect, deodorizing effect or the like. If the odor substance is added to toner, the effect is obtained only during printing, but if the odor substance is retained in the odor generator 40 on the toner containers 4*a* to 4*d*, the odor substance can be always diffused.

Odor substances with an insect-repellent effect include linalool, terpineol, and allylic esters. The odor substances with a deodorizing effect include stabilized chlorine dioxide, sesquiterpene, and green-tea catechin. In the color printer 100, a fan (not shown) is arranged for cooling inside the apparatus and this fan can be driven to diffuse the odor substance around the installation site.

The present disclosure is not limited to the above embodiments and can be carried out with any modifications made without departure from the spirit of the present disclosure. For example, in the above embodiments, the toner containers 4*a* to 4*d* that supply toner to the development devices 3*a* to 3*d* are identified by a method employing the odor generator 40 attached to the toner containers 4*a* to 4*d* and the odor sensor 50 provided in the container mounting portion 101; however, the toner storage containers to be targeted for identification are not limited to the toner containers 4*a* to 4*d*.

For example, a development cartridge having the toner containers 4*a* to 4*d* and the development devices 3*a* to 3*d* integrated together and a drum unit having also the photosensitive drums 1*a* to 1*d* integrated in it are also included in the toner storage containers to be targeted for identification by the identification method using the odor generator 40 and the odor sensor 50 according to the present disclosure.

The present disclosure is not limited to development devices 3*a* to 3*d* that use two-component developer containing toner and magnetic carrier, but is also applicable to image forming apparatuses including development devices employing a one-component development method that use magnetic one-component developer containing only magnetic toner.

The present disclosure is applicable not only to the color printer 100 like the one shown in FIG. 1 but also to any other types of image forming apparatuses such as monochrome printers, monochrome copiers, color copiers, digital multifunction peripherals, and facsimile machines, that is, image forming apparatuses having the toner storage container that is removably mounted in them.

The present disclosure can be used in image forming apparatuses including a toner storage container that is removably mounted in the image forming apparatus. Based on the present disclosure, it is possible to provide an image forming apparatus that can identify the type of toner storage container easily in a manner difficult to imitate.

What is claimed is:

1. An image forming apparatus comprising:

an image forming portion that includes an image carrying member and a development device that develops an electrostatic latent image formed on the image carrying member into a toner image, the image forming portion forming the toner image based on image data;

a toner storage container that stores toner for forming the toner image, the toner storage container being removably mountable in a main body of the image forming apparatus;

an odor generator that is provided on the toner storage container, the odor generator carrying an odor substance;

an odor sensor that is provided in the main body of the image forming apparatus, the odor sensor sensing the odor substance diffusing from the odor generator; and a control portion that identifies a type of the toner storage container based on the odor substance sensed by the odor sensor, wherein the toner storage container is rotatable, with the odor generator provided at a position where the odor generator is rotatable together with the toner storage container, and the control portion rotates the toner storage container after the toner storage container is mounted in the main body of the image forming apparatus before toner supplying operation is started, and senses the odor substance at a sensing position at which the odor generator is closest to the odor sensor.

2. An image forming apparatus according to claim 1, wherein when a sensing output from the odor sensor is maximal, the control portion recognizes the sensing position and senses the odor substance.

3. An image forming apparatus according to claim 1, wherein the odor sensor is arranged at a position at which the odor sensor overlaps with the odor generator in a direction of a rotation axis of the toner storage container, and the odor sensor and the odor generator face each other at the sensing position.

4. An image forming apparatus according to claim 1, wherein the control portion stops rotation of the toner storage container at the sensing position to sense the odor substance.

5. An image forming apparatus according to claim 1, wherein when not sensing the odor substance with the odor sensor, the control portion stops rotation of the toner storage container at a standby position at which a distance between the odor generator and the odor sensor is greater than at the sensing position.

6. An image forming apparatus according to claim 5, wherein the standby position is at a side opposite from the odor sensor across a rotation axis of the toner storage container.

7. An image forming apparatus according to claim 1, wherein at power-on of the image forming apparatus or after, with the image forming apparatus powered-on, a cover member that is opened and closed when the toner storage container is mounted or removed is opened and closed, the control portion rotates the toner storage container to sense the odor substance.

8. An image forming apparatus according to claim 1, wherein the control portion senses the odor substances while rotating the toner storage container in a direction opposite to a direction during toner replenishment.

* * * * *